United States Patent [19]

Ruchel

[11] Patent Number: 4,953,317
[45] Date of Patent: Sep. 4, 1990

[54] NONFREEZING FISHING APPARATUS

[76] Inventor: James E. Ruchel, 423 Third St., Albany, N.Y. 12206

[21] Appl. No.: 376,833

[22] Filed: Jul. 7, 1989

[51] Int. Cl.$^5$ .............................................. A01K 97/12
[52] U.S. Cl. ......................................................... 43/17
[58] Field of Search .................................. 43/4, 16, 17

[56] References Cited

U.S. PATENT DOCUMENTS

| | | | |
|---|---|---|---|
| D. 196,888 | 11/1963 | Pilsner | 43/17 |
| 1,253,746 | 1/1918 | Teeling | 43/17 |
| 2,883,784 | 4/1959 | Obernolte | 43/4 |
| 3,010,238 | 11/1961 | Crumbrine | 43/16 |
| 3,745,689 | 7/1973 | Williams | 43/17 |
| 4,253,262 | 3/1981 | Johnson | 43/17 |
| 4,662,099 | 5/1987 | Stewart | 43/17 |
| 4,780,979 | 11/1988 | Dyck | 43/17 |
| 4,794,718 | 1/1989 | Tillyman | 43/17 |

*Primary Examiner*—Kurt Rowan
*Attorney, Agent, or Firm*—Schmeiser, Morelle & Watts

[57] ABSTRACT

An ice fishing assembly of a radiant energy absorbing bubble-like cover and paraphernalia resembling commonly employed ice fishing devices. The minimum apparatus of this invention consists in an somewhat irregular dome shaped cover that is made from any material that will absorb and transmit, to the air confined under the cover, impinging solar radiant energy. In operation, the cover is placed over an ice fishing hole and its enhanced-design ability to collect radiation assures that the water surface beneath the air space confined within the cover will remain unfrozen. Conventional ice fishing apparatus such as fishing line placed on a suitable spooling device, with a tip-up flag or alarm actuating means penetrating through the cover, or in the case of solely visual means enclosed within the cover, are attachable to the cover proper or to a transitional piece that is insertable between the cover and the ice-covered water surface. Use of the transitional or spacer-conduit piece allows the mounting of the traditional fishing gear to the spacer-conduit element, rather than supporting it within the cover architecture.

8 Claims, 3 Drawing Sheets

NONFREEZING FISHING APPARATUS

BACKGROUND OF THE INVENTION

1. Field of the Invention

This invention relates generally to fishing equipment which inherently resists freezing of the line and operating mechanisms when the ambient air is below freezing. More particularly, the instant device acquires its general functional aspects through use of an insulative dome, capable of acting as a reservoir of radiant heat, the purpose of which is to cover an ice fishing hole, thus maintaining above-freezing temperatures in the environs of the hole and the proximate operative fishing mechanisms.

2. Discussion of the Background Art

Before commencing a discussion of the relevant art discovered by the applicant after an exhaustive patent search, a brief discussion concerning the art and techniques of ice fishing is in order. Unlike fair weather angling, ice fishing is generally performed in two modes and oftentimes under less than clement conditions. The two techniques or modes generally employed by the ice fishing angler are jigging and still fishing, by use of a fixed apparatus, most often a tip up mechanism. The term "tip up" is one of long time usage because in its earliest form, a portion of the apparatus which was actuated whenever a fish took the bait would be projected upward, carrying with it some form of invisible indicia to indicate to the angler that the apparatus was actuated or, more coloquially, "the trap was sprung". Whereas jigging involves merely the manipulation or "playing" of the fishing apparatus over a hole which has been bored into the ice, the tip up itself has taken on many forms over the years and is the subject of this instant teaching.

Irrespective of the actual embodiment or ornamentation peculiar to the discrete device, the actions of the angler rarely vary during practice with the tip up during any angling activity. Generally, after a hole is bored into the ice, a tip up mechanism, ranging from a simple crossed brace platform to a solid platform, is placed over the fishing hole. The basic operative mechanism, generally a reel, a sufficient amount of fishing line wound about the capstan of the reel mechanism and catchment means such as a barbed hook with suitable baiting thereon, is employed. The reel mechanism is placed on the platform integrally therewith, and is located beneath the water surface, between the water surface and the platform proper, or on the platform and/or substantially above it. In the instant discussion, we have need to concern ourselves with the platform means that substantially covers the hole and contains the operative (reel) mechanism therein, presenting substantially all of the operating mechanism between the surface of the water and the platform proper.

When a fish takes the bait presented by the tip up apparatus, a portion of the apparatus is actuated and the visual indicator, generally a flag type device, or a portion of a moving cross brace, is translated upward. Before the advent of the waving flag, the more primitive tip ups, (since they were nothing but crossed brace mechanisms), "teetered" the free end of the apparatus-containing brace upward; hence the "tip up" characteristic of the device's actuation would signal the angler of the actuation. Oftentimes, companion fishermen would shout "tip up" to also alert the angler to the fact. It was perhaps this shout that gave several intrepid inventors the idea of coupling the triggering mechanism to varying audio and visual devices. Nonetheless, in today's ice fishing art, there is a plethora of art disclosing "tip up" activation. Examples of the aforementioned art are seen in patents issued to Marsh in 1916 (U.S. Pat. No. 1,173,827) and to Stelmach in 1970 (U.S. Pat. No. 3,545,118) for the disclosure of novel mechanisms which also included visual means (an energized light bulb) of actuation. Notably in the Stelmach disclosure, the warning light is enshrouded by a conical shade which would most likely give one of ordinary skill the notion that, in place of a light bulb, a simple vibrating diaphragm with a circuit interrupter might be employed to effect an audio warning. In any case, the instant inventor would cut short this digression into tip up activation warning devices because, in the instant invention, he employs the conventional mechanisms such as a reflexing flag or energized light bulb alarms. It should be noted by the reader however, that the basic inventive concept and apparatus employed in the instant invention is readily adaptive to and receptive of numerous audio and visual alarm mechanisms.

When the angler is aroused by the actuation of a tip up, he or she must quickly move to the actuated mechanism and halt the playing out of fishing line. Numerous devices have been used over the years contained within the operative mechanism or at the catchment means, for setting the hook and thereby ensuring the catch. These devices notwithstanding, it is within the experience of the instant inventor to state his belief that more fish are lost due to ensnarement by the fisherman in his or her apparatus than by fish successfully absconding with the bait. For this reason, he believes that the more contrived the fishing apparatus, the greater the likelihood of losing the fish. He contends that the more antiquated aspects of ice fishing, which use the primitive tip up mechanism, are most suitable in the long run. In the pristine stages of its usage, the tip up was generally grasped and tugged directly upward with one hand while, concurrently, the other hand is brought about to securely grasp the line. Thereafter, the tip up mechanism proper is set (more often thrown) to one side and the line is rapidly retrieved in a hand-over-hand fashion until the fish is brought close enough to the hole to determine if it can be lifted directly out or if resort must be made to the gaff. After the catch is made and the hooks rebaited, the line is lowered back into the hole and the triggering mechanism reset as the excess line is "spooled on" to the reel and the tip up mechanism is represented over the hole. In the previously described melodrama, there are two points at which the traditional ice fishing mechanism, whether it be the more primitive or the more current type, can give the angler problems. Under freezing ambient conditions, and if the angler has been lax, the water in the hole may have frozen to some degree or completely; and, if the mechanism had been previously actuated so that it became wet, the entire operative mechanism may be frozen. It is obvious what kind of difficulties will follow from such a set of conditions. The second point, during the rebaiting and reposturing of the tip up over the hole, the entire mechanism may have frozen. Although most modern fishing lines or elements if frozen may be nonetheless respooled or rewound onto the reel, other incidents of the apparatus such as the rotatability of the reel, pivoting and actuation of the trigger mechanism and/or switches for audio/visual alarms will undoubtedly be frozen. Clearly, an invention that would, by its very nature, obviate all of the aforementioned problems would be of immense value to the ice fishing enthusiast. Thus, what is long sought after and fulfilled by the instant invention, is a non-freezing ice fishing apparatus that maintains an "open" ice fishing hole, and nonfreezing operative mechanism and ease of operation, including a facility for easy storage and transport of the mechanism onto and off of the ice. The latter trait is something that cannot obviously be added on to the invention; but rather, it is a trait which must be inherent in the mechanism's design. Such is the instant invention.

Relative to fishing hole coverings, either substantial or intoto, consider the previously mentioned patent issued to Marsh in 1916. Marsh set his mechanism (questionably a tip up mechanism) on top of a platform or board and projected portions of the catchment mechanism through a hole in the board down through the hole in the ice. The mechanism projected through the board comprised a tubular element which was the novel feature of the Marsh apparatus and from which the device's anti-freezing characteristic was derived. Marsh was silent as to whether the board provided an efficacious means of preventing ice hole freeze up; but such is understandable, since he avoided addressing that subject by providing an alternate apparatus which appeared to work well. An inherent disadvantage of the Marsh apparatus, and perhaps the reason why he employed the earlier mentioned visual indication means of alarm, was that the profile of the quiescent apparatus was extremely low. As any veteran fisherman will attest, low profiled fishing apparatus, on the ice, are more often than not lost in the white haze or covered by snow. The instant inventor has provided an easy to use mechanism that will prevent refreezing of the hole, prevent refreezing of wetted apparatus, continue after initial operation to provide reliable and responsive service and, in the event of light snow, present an adequate profile so that the angler may readily locate the device without having to rely upon actuation of the tip up feature.

Two patents that were very relevant to hole-covering, anti-freeze devices were those issued to Obernolte in 1959 (U.S. Pat. No. 2,883,784) and Johnson in 1981 (U.S. Pat. No. 53,262). Obernolte taught the use of a reeling mechanism, totally enclosed and contiguous with a bell or dome shaped base which has therein heat generating means. It is apparent from a close study of the Obernolte art that the reeling mechanism, for taking in and playing out the fishing line, is disposed at a comfortable level for the angler to stand before the hole and reel in the quarry without having to resort to removal of the tip up mechanism for hand-over-hand retrieval of the line. The stanchion on which the reel stands, and in which it is sealed, communicates with a dome shaped base that is placed directly over the ice fishing hole. Use of the invention, because of an internal heat-generating means (a candle), requires a stylistic shaping of the ice fishing hole, thus requiring the angler to use not only an ice bore but also some form of spud to cut out the stylized hole shape. That Obernolte's dome does not provide the retention of sufficient heat to maintain a significant amount of the apparatus free of ice and freeze ups is apparent, because he is forced to use auxiliary heat generating means. Further, it is questionable whether the stand-off posturing of the reel is the sole cause for the additional heat requirement. By using a dome shaped base, a hemisphere or one half of a sphere, Obernolte has selected a geometry that affords deminimus surface area and therefore has the least capability of any shape for absorbing radiant energy. Further, this geometry, having the least surface area, encompasses the least volume and thereby retains the smallest amount of air, heated or otherwise, over the ice fishing hole. It may be concluded that, as long as the candle or such heat generative means are employed, the Obernolte invention properly served the needs of its inventor. Further to the invention of Obernolte is the use of a girdling groove about the periphery of the base, which the inventor suggests may be used for the stowage of additional fishing line. Of course, in order to maximize the stowage volume the groove is made as close to the base margin (literally a great circle of the sphere) as practicable. With or without the embellishments presented in this invention, it cannot reasonably serve the needs of the instant inventor who has, as previously stated, the desire to provide a device that will act as a reservoir for the radiant energy that constantly bathes the device, the capacity for easy storage and portability and means for providing antifreeze facility to the operative mechanism, while allowing the angler to operate the entire mechanism in as close a manner to the early or primitive tip up fashion that has proven, over the years, to be so functional.

Final to this discussion of the relevant art, the patent issued to Johnson discloses an ice fishing tip up apparatus which includes a heated flotation member that can be described as bowl-like in structure. This, of course appears to be nothing more than an inversion of the Obernolte device, one of the references cited during the prosecution of the Johnson application. Quite notably, Johnson's apparatus, consisting in the hemispherical dome and vertical stanchion terminating with a reel mechanism, is as far from the instant inventor's art as it was from Obernolte's. In fact, to the incidents just mentioned, it bears a remarkable resemblance to Obernolte, save for the fact that it is totally inverted, that is, the reel mechanism is under water and the dome is, indeed, a bowl floating upon the water. That it is inserted into an ice fishing hole is the only truly relevant feature worthy of mention. It is interesting to note, however, that the Johnson device will prevent the freeze up of the ice fishing hole; but only because, for the most part, it obstructs the hole itself. The heating mechanism used by Johnson is that of combustible material ignited in the bottom of the aforementioned bowl. The instant inventor obviates all of these contrivances with a mechanism that shall be hereinafter disclosed in detail.

SUMMARY OF THE INVENTION

In order to achieve the previously stated objectives, the instant inventor has devised an ice fishing assembly comprising a radiant energy-absorbing cover which contains, in an essentially enshrouded environment, paraphernalia for traditional ice fishing. These paraphernalia, comprising axle mounting means that are affixed to the cover inner periphery, an axle for mounting a spoolpiece thereon, a spoolpiece having at least one end eccentrically shaped, a dog leg element mounted through the cover but having at least one leg thereof susceptible of toggling by a portion of the eccentric spool end and one or two elements, traditional in nature, for effecting visual alarm of actuation.

The cover is constructed by shaping a radiant energy-absorbing material, such as polyethylene, into a slightly flatened blister shape. The cover is circular in geometry, from a top perspective, and somewhat rectangular in its side elevational cross section. It is the purpose of the cover to absorb solar radiant energy and transmit the energy to the air enshrouded by it or literally entrapped under the cover. Placement of the aforementioned paraphernalia within and attached to the cover assures the angler that the essential operative mechanism will be continually bathed in an ambient air that is being heated with higher efficiency than that of earlier dome-shaped apparata because of the increased surface absorption area of the instant invention.

A transitional piece, a spacer-conduit, is afforded as alternate paraphernalia mounting base, should the depth-of-hole (the ice fishing hole), in combination with extremely cold ambient conditions, make such alternate usage necessary. The linkage from the spool piece to the tip up flag or alarm switch of the paraphernalia is, as previously mentioned, traditional in most respects and is disclosed herein as a mere adjunct to the novel elements of the invention.

DETAILED DESCRIPTION OF THE PREFERRED EMBODIMENT

Figure 1A:
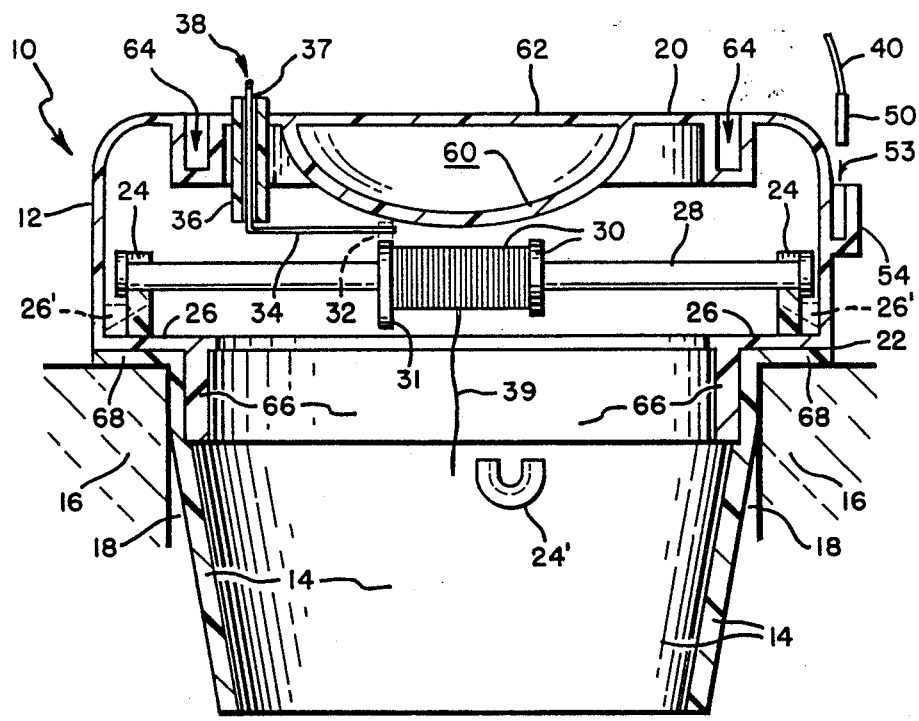
FIG. 1A is a sectionalized elevational illustration of the invention.

The instant invention enjoys a basic and alternate mode in its preferred embodiment. Referring particularly to FIG. 1A, there is first shown the alternative mode 10 of the invention comprising the basic invention 12 and its transitional piece 14 in mated or interlocking configuration and set over the ice 16, in which a hole has been bored. The basic invention 12 is herein seen to comprise the following elements: a cover element or shell 20 having an elevational cross section described as essentially rectangular yet, from above, the cover 20 being circular with its periphery 22 of greater circumference than hole 18; a mounting bracket 24 within the cover 20, attached to base flange 26 or alternately to the periphery of the dome at 26'; an axle 28 rotatably mounted in brackets 24, 26'; a spoolpiece 30, securely fixed to axle 28 and having an eccentric end 31; a lobe 32 on eccentric end 31; a dogleg-shaped trip link 34 mounted in cover sleeve inlet 36, so as to be engaged by lobe 32 when spoolpiece 30 undergoes a revolution or partial revolution; a slight projection of link 34 above the cover inlet 36; and means for providing linkage, here an orthogonal projection 38 off link 34, for tripping an alarm flag (alarm flag base 50 only shown, remaining alarm flag mechanism detailed in FIG. 2). The alarm flag base 50 is removably insertable into cavity 53 of side mounting bracket 54. In this illustration, the flexible pole or spring wire 40 of the alarm flag (not shown) is partially visible. Quite important to the increased surface area of the cover 20 is the hemispherical depression 60. In addition to increasing the surface area of the cover. depression 60 further facilitates use of handle 62. The handle 62 is quite necessary for full functional usage of the invention simply because the high impact resistant polystyrene or polyethylene construction of the cover, as envisioned by the inventor, must have some form of purchase so that a gloved angler might readily pull it from the hole and set it positively in a desired location. Since the action presumed to be accomplished with this device, is done in a remarkably short span of time, a handle of this nature or one having a slightly, arcuate elevation is well advised. Final to the basic invention 12 is the top circumferential groove 64. Circumferential groove 64, the reader will note, is dimensionally receptive of the cover 20 projecting annular flange 66. This facility, with attendant apparatus groove 64 and projecting annular flange 66 design features, allows several units of the basic invention 12 to be nested within one another, i.e., stacked atop one another and placed in a separate container as hereinafter disclosed in FIG. 3.

Finally, in FIG. 1A, transition piece 14 is seen in conjunction with the basic invention (piece) 12. Transition piece 14, like the basic invention 12, rests atop the ice 16 on its integral annular flange 68. The peripheral flange 26 of cover 20 is seen to rest atop transitional piece 14 annular flange 68 so that its projecting annular flange 66 is in registry with the upper inner periphery of transition piece 14. Final to the transition piece 14, there is disclosed alternate axle 28 mounting bracket 24', used in cases where the transitional piece 14 is employed over a thicker ice environment. Alternate bracket 24' is, however, an optional element and should not be considered a limitation on the invention's usage of transitional piece 14. Final to the FIG. 1A illustration, fishing line 39 is seen descending from spoolpiece 30.

Figure 1B:
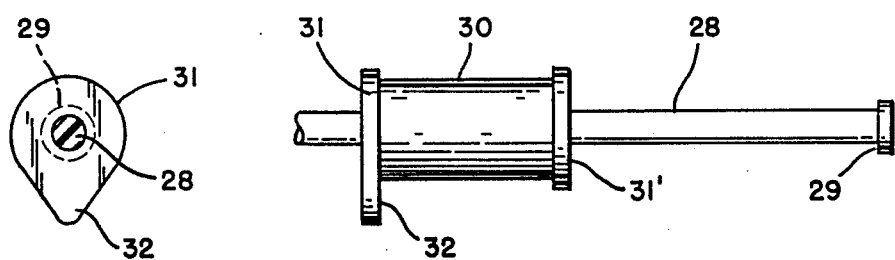
FIG. 1B is a two-view orthographic illustration of the invention showing the eccentric end of the spoolpiece and a side view of the spoolpiece and partial axle therefore.

Referring now to FIG. 1B, the orthogonal illustration therein illustrates the end and side elevation of the spool-piece 30 and axle 28 ensemble. In the left view, the eccentric spool end 31 is clearly distinguished by lobe 32 which serves to toggle an end of link 34 (as seen in FIG. 1A). Otherwise, spoolpiece 30, firmly affixed to axle 28, which is mounted in brackets 24 or 26' and secured therein by axle flange 29, is unremarkable.

Figure 2:
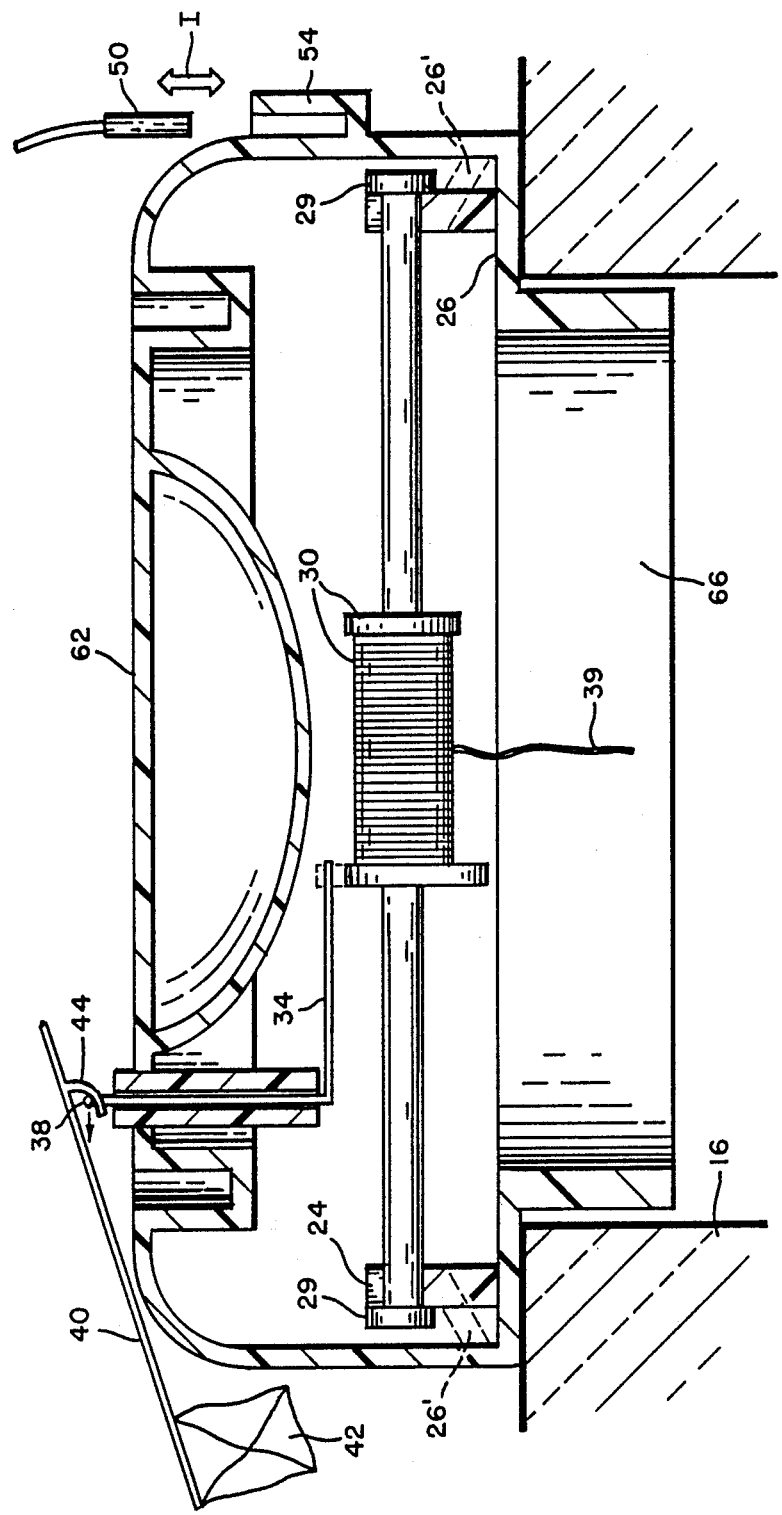
FIG. 2 is an enlarged elevational cross section of the invention.

FIG. 2 is a closer detail of the basic invention 12 showing the flag 42 apparatus. Herein it will be noted that the basic apparatus 12 may rest by its peripheral flange 26 directly on the ice and be literally "captured" by the ice hole at its projecting annular flange 66. The reader should note that the double barbed arrow I denotes the insertion and withdrawal directions of flag base 50 into its mount 54. The reader will also note that flag 42 is affixed to its shaft 40 and that a suggested means for its restraint, namely catch 44 is shown. By the toggling of link 34, the orthogonal projection 38 of the link may be rotated in the direction shown by the small arrow, thus releasing catch 44 and, concomitantly, the alarm flag. This apparatus is rather traditional and there are several modes of embodiment that are known to those of ordinary skill.

Figure 3:
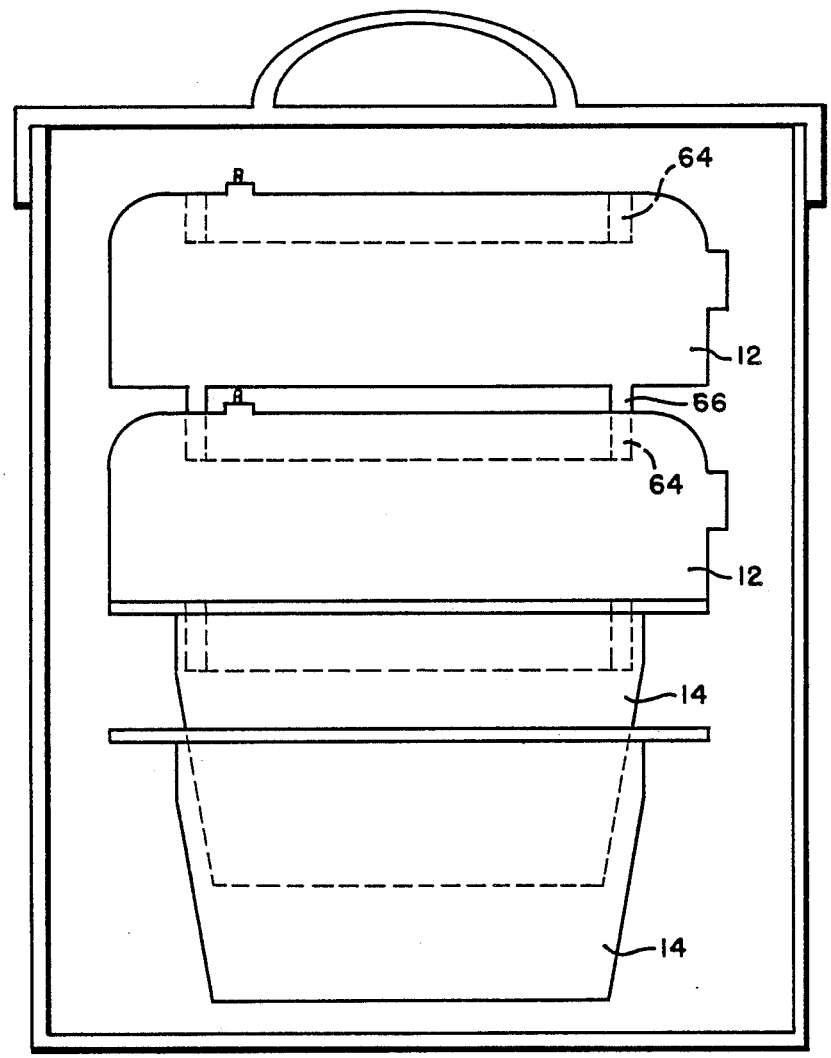
FIG. 3 is an elevational cross section of a carrier for the invention.

Final to this description is the illustration of FIG. 3 wherein, by this illustrative device, the reader may observe the stacking method for the basic invention 12, as well as transitional pieces 14. Here, the reader can readily discern the great facility acquired through the use of groove 64 in cover 12 and the cover's annular projecting flange 66. It should also be noted that the transitional piece 14 is not only receptive of flange 66 but of its own replications 14, as well.

It is believed that an initial use of the invention will be sufficient for those of ordinary skill to learn of its novel application and high degree of utility in the ice fishing art. By the following appended claims, the instant inventor secures to himself those novel aspects and the rights thereto, and by this disclosure hopes to provide to the field and the sports enthusiasts who participate in this exciting artform the benefits of the invention.

What is claimed is:

1. A portable totally self-contained and deployable, readily stackable ice fishing assembly comprising:
   a dome-like shell of suitable, radiant energy absorbing material comprising a cover fixed to an annular, essentially planar base from which depends a short flange conterminous with the annular, internal edge of said base, said shell having a bracket mounted therein and on an interior surface of said shell for mounting a fishing line spoolpiece thereby wholly containing said bracket and spoolpiece; and,
   a grooved morphalogical means on the outer top surface of said shell for fittably stacking a plurality of said shells, one such shell nested or stacked atop another by inserting the short flange into said grooved morphalogical means, whereby said ice fishing assembly is set up by taking it from a stacked storage array, fishing line is deployed from the internally mounted spoolpiece into an ice hole, and the assembly is placed in superposition on the hole with said base resting on the ice and said short annular base flange projecting part way into the hole.

2. The invention of claim 1 wherein said shell further comprises means therein for rotatably mounting a long-axled spoolpiece.

3. The invention of claim 2 wherein said spoolpiece further comprises a spool having means thereon for tripping an alarm device.

4. The invention of claim 3 wherein said alarm device is a spring wire which is removably attachable to said shell.

5. The invention of claim 3 wherein said alarm device provides a visibly detectable signal.

6. The cover-base shell and base flange assembly of claim 1 and a spacer-conduit for interpositioning in combination with and below said shell and between said shell and the ice, thus spacing said base portion from the ice, and for concurrently providing a conduit for the fishing line and a mount for the spoolpiece of the invention, said spacer-conduit element comprising:
   a singular and essentially cylindrical, open-ended conduit made of suitable material, one end of which is orthogonally flanged and receptive therein of said base flange of said cover-base shell so that, when said conduit is positioned into an ice hole, its orthogonal flange rests on the ice and spaces said cover-base shell therefrom; and
   conduit wall projection means for rotatably mounting therein an axled spoolpiece, said projection means disposed substantially below said conduit flange and the area covered by said base flange when inserted thereinto.

7. The invention of claim 7 wherein said conduit includes a tapering of the other, non-flanged end so that one of said spacer conduits will fit into or nest within another such spacer conduit.

8. A portable, interfittably stackable assembly for ice fishing that is comprised of a hollow shell, said shell comprised of a dome which is fixed to a base annulus, said annulus bearing a dependent, orthogonal flange protruding below said base, said assembly being stackable in an essentially vertical array by fitting onto another of said assemblies and having an improvement for acquiring said stackability through interfitting, said improvement comprising:
   an annular, peripheral groove on the top surface of said shell, the diameter of said groove of a size to accept insertion therein of said dependent, orthogonal flange of another of said bases, whereby one or more of said assemblies is readily stackable atop another.

* * * * *